United States Patent Office 3,536,778
Patented Oct. 27, 1970

3,536,778
PROCESS FOR DIMERIZATION, CODIMERIZATION, POLYMERIZATION AND COPOLYMERIZATION OF MONO-OLEFINES
Normann Bergem, Oslo, Ulf Blindheim, Skedsmokorset, Olav-Torgeir Onsager, Bekkestua, Baerum, and Hagbarth Wang, Oslo, Norway, assignors to Sentralinstitutt for industriell forskning, Oslo, Norway
No Drawing. Filed Sept. 22, 1967, Ser. No. 669,686
Claims priority, application Norway, Sept. 24, 1966, 164,870
Int. Cl. C07c 3/10
U.S. Cl. 260—683.15     5 Claims

ABSTRACT OF THE DISCLOSURE

Monoolefins having four to thirty carbon atoms and a high content of B-olefins are prepared by reacting olefines from the range $C_2$-$C_{15}$ in presence of a catalyst system comprising a metal (O) and/or metal (I) compound of a metal from the 8th side group (Group 8B) of the Periodic Table, a Lewis acid in the form of compound of the metals of the 2nd and/or 3rd group of the Periodic Table, and, if desired, a Lewis base of the elements of the 5th and/or 6th group of the Periodic Table, at a temperature of preferably not above 150° C. The catalyst system may comprise $Ni(PCl_3)_4$ and ethyl aluminum dichloride.

---

The present invention relates to the conversion of lower monoolefines into higher monoolefines having a high content of β-olefines by using new homogeneously acting catalyst systems.

From the literature it is kown that beryllium, aluminium, gallium and indium compounds containing Be—H, Al—H, Ga—H, In—H, Be—C—, Al—C—, Ga—C— or In—C— bonds are able to add α-olefines forming higher organic beryllium, aluminium, gallium and indium compounds. Reactions of this type are usually called "addition reactions" ("Aufbaureaktionen") according to the original papers by K. Ziegler in this field. Further it is known that the influence of lower α-olefines on higher organic beryllium and aluminium compounds under other reaction conditions may have a substituting effect, whereby the higher alkyl groups are displaced in the organo metallic compound with the formation of α-olefines. This so-called "displacement reaction" ("Verdrängungsreaktion") is catalyzed by metallic cobalt, platinum and nickel and particularly by metallic nickel in finely divided colloidal form. By a combination of addition reaction with subsequent displacement reaction, it is thus possible to convert lower α-olefines into higher α-olefines. Thus a dimerization of ethene with Al(ethyl)₃ as addition catalyst and colloidal nickel as displacement catalyst gives n-butene-1, a trimerization of ethene gives n-hexene-1, a tetramerization of ethene gives n-octene-1 as reaction product, etc. By the dimerization of propene with Al(propyl)₃/colloidal nickel as catalyst 2-methylpentene-1 is formed as reaction product (German Pat. No. 964,642, German Auslegeschrift No. 1,178,419 and U.S. Pat. No. 2,695,327). Drawbacks of the known oligomerization processes of the Ziegler type are, in addition to the heterogenous character of the catalyst systems due to the transition metal addition, that very high catalyst concentrations of the organic beryllium or aluminium compounds are used, up to 20% of the reaction mixture. In addition these mixtures are highly inflammable and explosive at the high temperatures and pressures—up to 250° C./200 atm.—which are necessary to obtain a satisfactory time yield during the synthesis.

From U.S. Pat. No. 2,969,408 it is known that additions of nickel compounds in the form of salts of inorganic and organic acids or in the form of certain organonickel complexes are able to cause the same type of displacement reaction as colloidal metallic nickel and together with organometallic halides give α-olefines as primary reaction product. In the examples given in the patent the nickel compound is reduced to metallic nickel, which means that the catalyst systems used are of the same type as the ones discussed above.

Thus, it is a characteristic feature of the known oligomerization reactions of the Ziegler type that lower α-olefines take part in an addition reaction and that in the subsequent displacement reaction higher α-olefines are liberated as reaction product.

Our copending applications Ser. No. 526,079 of Feb. 9, 1966 and now U.S. Pat. No. 3,442,971, Ser. No. 630,843 of Apr. 14, 1967 and now abandoned and Ser. No. 661,004 of Aug. 16, 1967 describe processes for dimerization, codimerization and oligomerization of olefines from the range $C_2$-$C_{15}$.

The above processes employ catalyst systems formed by transition metal compounds from the 8th sidegroup of the Periodic Table in combination with Lewis acids of the metals in 2nd and 3rd main group of the Periodic Table, in which the transition metal component contains the transition metals in the form of bi- or tri-valent cations.

According to the present invention a series of metal-(O)- and metal-(I)-compounds of the transition metals in the 8th group of the Periodic Table have been found, which in combination with Lewis acids in the form of the metals in 2nd and 3rd main group of the Periodic Table represent highly selective and actve homogeneously acting catalyst systems for the formation of monoolefines in the range $C_4$-$C_{30}$ having a high content of β-olefines by dimerization, codimerization oligomerization and co-oligomerization of olefines from the range $C_2$-$C_{15}$ with the formation of olefines in the range $C_4$-$C_{30}$.

Further it has been found that additions of Lewis base compounds of the elements in the 5th and 6th main group of the Periodic Table in the form of ethers, thioethers, amines, phosphines, arsines, pyridine compounds and the like may be of fundamental importance for the activity as well as the selectivity of the catalyst systems.

The above mentioned transition metal-(O)-compounds have the following general composition:

in which Me is a metal from the 8th side group of the Periodis Table and in which L represents CO, NO and/or a mono-, bi- or polyfunctional neutral residue coordinatively bonded to Me through one or more functional groups of the type:

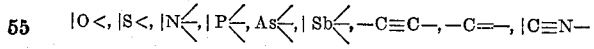

and the like, with n is 1 to 6.

Compounds of the following type may be used as the above mentioned transition metal-(I)-compounds:

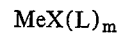

in which Me and L have the same meanings as above, and in which X represents an acid equivalent such as halide, cyanide, hydride and the like or a negatively charged organic residue containing from 1—12 carbon atoms, such as ethyl, phenyl or cyclopentadienyl, with m is 1–5.

Typical Me—(O) compounds satisfying the above conditions and being effective catalyst components for dimerization and oligomerization of olefines are illustrated by the following nickel compounds, it being understood that the corresponding compounds of the other transition metals in the 8th group in the Periodic Table and particularly those of the metals Co, Rh and Pd may also be used:

Ni(CO)$_4$, Ni[PCl$_3$]$_4$, Ni(CO)$_3$[P(phenyl)$_3$],
  Ni(CO)$_3$[As(phenyl)$_3$],
Ni(CO)$_2$[P(butyl)$_3$]$_2$, Ni(CO)$_2$[(phenyl)$_3$,],
  [Sb(phenyl)$_3$],
Ni(CO)$_2$[2.2′-dipyridyl], Ni(CO)$_2$[O-phenanthrolin],
Ni(CO)$_2$[(phenyl)$_2$P-C$_2$H$_4$-P(phenyl)$_2$],
  Ni(CO)[P(methyl)$_3$]$_3$,
Ni(CO)[P($\beta$-cyanoethyl)$_3$]$_3$,
  Ni(CO)$_2$[P(N(n-butyl)$_2$)$_3$]$_2$,
Ni[P(phenyl)$_3$]$_4$, Ni[O-phenylene-bis-dimethylarsine]$_2$,
Ni[P(phenyl)$_3$]$_2$(CF$_3$—C≡C—CF$_3$),
  Ni[P(n-butyl)$_3$]$_2$(phenyltricyanoethene),
Ni[P(n-butyl)$_3$]$_2$(duroquinone),
  Ni[P(phenyl)$_3$]$_2$(cyclooctadiene),
Ni(cyclooctatetraene)$_2$, Ni[CH$_2$=CH—CN]$_2$,
  Ni[CH$_2$=CH—CN]$_2$[P(phenyl)$_3$], and
Ni[C≡N-phenyl]$_4$.

The following compounds may be mentioned as typical Me-(I) compounds of the transition metals of the 8th group of the Periodic Table:

RhCl[P(phenyl)$_3$]$_3$, Rh(SCN)[As(phenyl)$_3$]$_2$(CO),
  [P(phenyl)$_3$]$_3$NiCl
RhCl[P(phenyl)$_3$]$_2$, Rh$_2$(CO)$_4$Cl$_2$,
  (ethene)$_2$Rh(acetylacetonate),
(tetraphenylcyclobutadiene)Co(Br)(CO)[P(phenyl)$_3$],
(Ni[P(phenyl)$_2$](CO)$_2$)$_2$, [(cyclopentadienyl)Ni(CO)]$_2$,
(cyclopentadienyl)Ni(NO),
  (cyclopentadienyl)Ni(CO)[P(phenyl)$_3$] and
  (cyclopentadienyl)$_2$Ni$_2$(diphenylacetylene).

From the literature it is known that the coordinatively bonded ligands such as the carbonyl groups in transition metal compounds such as Ni(Co)$_4$, Co$_2$(CO)$_8$, Fe(CO)$_5$ and Fe$_2$(CO)$_9$ may readily be substituted by coordinatively bonded ligands containing functional groups of the types:

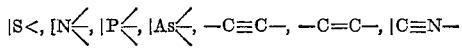

and the like, and that mutual exchange of such ligands may take place. The following 3 examples illustrate these circumstances:

(1) Ni(CO)$_4$+2P(phenyl)$_3$→
  Ni(CO)$_2$[P(phenyl)$_3$]$_2$+2CO
(2) Ni(CO)$_4$+4PCl$_3$→Ni[PCl$_3$]$_4$+4CO
(3) Ni(CO)$_2$(2.2′-dipyridyl)+P(n-butyl)$_3$→
  Ni(CO)[P(n-butyl)$_3$](2.2′dipyridyl)+CO The formation of the active catalyst systems containing the above mentioned types of transition metal compounds may thus be performed either by using the substituted compounds as such, or by forming these in situ in the catalyst mixture by a reaction as indicated in the above examples.

The Lewis acid compounds must be soluble in the reaction mixture at least to such extent that the system is catalytically active. Further the Lewis acid compounds must not reduce the transition metal compounds to metallic form under given reaction conditions to such an extent that these no longer act as active catalyst components.

As Lewis acid component in the catalyst systems one or more compounds of the type: Be(R)$_a$(Y)$_{2-a}$ and Al(R)$_b$(Y)$_{3-b}$ may suitably be used, wherein R represents hydrogen and/or an aliphatic or aromatic hydrocarbon residue containing from 1–20 carbon atoms, Y is a monobasic acid residue, preferably halogen and/or —OR, —SR, NR$_2$ or —PH$_2$, $a$ is 1–2 and $b$ is 0–2.

As stated above where the Lewis bases are prereacted with the transition metal compounds the Lewis bases may similarly be prereacted with the Lewis acid compounds prior to adding these to the reaction system.

The following 3 examples illustrate these circumstances:

(1) AlBr$_3$+½P(n-C$_4$H$_9$)$_3$⇌AlBr$_3$·½P(n-C$_4$H$_9$)$_3$
(2) AlEtCl$_2$+¼P(C$_6$H$_{11}$)$_3$⇌AlEtCl$_2$·¼P(C$_6$H$_{11}$)$_3$
(3) Al(C$_6$H$_5$)Cl$_2$+P[N(n-C$_4$H$_9$)$_2$]$_3$
  ⇌Al(C$_6$H$_5$)Cl$_2$·P[N(n-C$_4$H$_9$)$_2$]$_3$

Thus, from the above explanations it appears that in those cases where Lewis bases are added to the reaction mixture, this may be done either by prereacting one of the catalyst components therewith, or by adding Lewis base as such.

Thus the following four examples represent typical catlyst systems:

(1) 1 mole Ni(CO)$_2$[P(phenyl)$_3$]$_2$/20 moles Al(ethyl)Cl$_2$
(2) 1 mole Ni[PCl$_3$]$_4$/10 moles Al$_2$(ethyl)$_3$Cl$_3$
(3) 1 mole RhCl[P(phenyl)$_3$]$_3$/5moles Al(ethyl)Br$_2$
(4) 1 mole Ni(CO)$_2$(2.2′-dipyridyl)/3 moles S(phenyl)$_2$/20 moles Al(ethyl)Cl$_2$.

It is an advantage of the process according to the invention that it employs a homogeneous catalyst system having such a high activity that the reactions may take place at low catalyst concentrations and mild reaction conditions.

The formation of the active catalyst system is very simple, since it occurs automatically at the mixing of the two, possibly three, types of catalyst components, suitably in the presence of an aliphatic or aromatic organic solvent such as n-heptane, dichloroethane, methylenechloride, cyclohexane, benzene, xylene, bromobenzene, chlorobenzene, nitrobenzene and the like, in an inert atmosphere.

A characteristic feature of the new catalyst systems described herein is that Me in the transition metal compound is not substantially reduced to metallic form and that the catalytic activity for the oligomerization reactions is caused by the presence of soluble transition metal complexes. This appears clearly from the selectivity and high activity of the catalyst systems compared with the previously known catalyst systems. Thus the activity of the new catalyst systems is very high already at as mild conditions as 20° C./1 atm. pressure using Lewis acids such as AlBr$_3$ and Al(C$_2$H$_5$)Cl$_2$ in the catalyst system. In view of the prior art it is clear that the reactions taking place in the process according to the present invention are not an addition reaction and a displacement reaction of the Ziegler type. That the catalyst systems used according to the present invention are not previously known also is clear from the composition of the monoolefines formed, since $\beta$- and $\gamma$-olefines are obtained in such high amounts that these can not have been formed entirely by isomerization of $\alpha$-olefines, but have to be primary reaction products as well.

Thus, by dimerization of propene to compounds having 2-methylpentene structure, the $\beta$-olefine 4-methylpentene-2 is formed as primary reaction product. In addition the dimerization of propene under given reaction conditions may be regulated to give C$_6$-olefines having a high content of double-branched olefines, such as 2,3-dimethylbutenes. Trimerization of ethene and codimerization of ethene and butene-2 and/or butene-1 may be regulated to give C$_6$-olefines having primarily 3-methylpentene structure, 3-methylpentene-2 being the predominant reaction product.

The proportions of the catalyst components may be varied within wide limits. The transition metal compounds are suitably used in such amounts that the ratio transition metal/Lewis acid metal is in the range 0.01 to 1.5, and the amount of Lewis base should be chosen so that the ratio of the donor equivalents in the reaction mixture to the sum of transition metal plus Lewis acid metal does not exceed 2. As used here donor equivalent means a Lewis base group having a free electron pair.

Thus, for example, triphenylphosphine has one donor equivalent per molecule while 2.2′-dipyridyl or ethylenediamine has two donor equivalents per molecule.

The concentration of the transition metal compounds may be chosen in the range $10^{-6}$–$10^{-1}$ mole per liter reaction mixture, where concentrations in the range $10^{-5}$–$10^{-2}$ mole per liter are favorable and concentrations in the range $10^{-4}$–$10^{-2}$ mole per liter are most suitable.

The process according to the invention may either be performed discontinuously as a batch process, for instance by passing the monomer or the monomer mixture, if desired under pressure, for a period of time such as 1–5 hours into a temperature regulated catalyst mixture and then recovering the reaction product by suitable separation methods such as fractional distillation, whereafter the catalyst and solvent, if any, or at least a part of these may be used for a new reaction, or continuously by passing the monomer or the monomer mixture in addition to the catalyst into a reaction zone, if desired under pressure, with subsequent continuous isolation of the reaction product. Unreacted monomer and solvent, if any, and catalyst are separated from the reaction product when recovering the latter, and are suitably returned to the reaction zone. In processes where the monomer is present in liquid form in the reaction zone, the solvent may advantageously be omitted.

The process may be carried out at pressures from fractions of an atmosphere up to high pressures, limited only by the apparatus construction. Because of the temperature control in the reaction zone it is, however, advantageous that the reactions in the reaction zone do not proceed too fast. The practical reaction pressure should therefore not exceed 100 atmospheres.

If a catalyst combination with purely inorganic Lewis acids such as Al(halide)$_3$ is used, the temperature in the reaction zone may be selected within wide limits, suitably a temperature within the range $-30$ to $+150°$ C. is used. However, if the process is performed with organometallic Lewis acids in the catalyst system such as Al(alkyl)$_2$(halide), Al(aryl)(dihalide), Al(alkoxy)(alkyl) halide), Be(alkyl)$_2$ and the like, the reaction temperature should be kept below the temperature range in which a substantial part of the transition metal compound is destructed and deactivated by conversion to metallic form during the reaction. The reaction temperature should in those cases preferably not exceed 100° C.

APPARATUS AND TECHNIQUE

When carrying out the Experiments 1–10, 13–16, 18–21, 24, 26–29, and 31 which are described in the examples, the following apparatus and work technique were used:

One or more of the above mentioned types of transition metal compounds, if desired together with a Lewis base compound, are charged into a thermostat-regulated glass reaction flask, equipped with magnetic stirrer, reflux condenser and dropping funnel with pressure-equalizing conduit. On the top of the reflux condenser there was a possibility of connection to vacuum, purified argon and starting monomer for the syntheses. Under argon flushing the desired amount of abs. solvent (distilled over P$_2$O$_5$ and LiAlH$_4$) was passed into the reaction flask. (In those cases where volatile Lewis bases such as tri-butyl-phosphine are used, these are passed into the reaction vessel at this time.) A Lewis acid of the above mentioned type or mixtures thereof, suitably diluted with solvent, is then passed into the dropping funnel in an argon atmosphere. The whole apparatus is evacuated carefully three times and is filled with starting monomer to atmospheric pressure after each time. At reaction time zero the two catalyst components, each saturated with starting monomer, are mixed under agitation in the reaction flask. The inflow velocity of the starting monomer which is necessary to maintain a constant pressure in the reaction flask (1 atm.), was measured in a capillary flow meter as a function of reaction time. The bath temperature was kept constant within the stated temperatures $\pm 0.05°$ C. by means of a water-circulation thermostat. After a certain reaction time the reactions were stopped by the addition of a saturated solution of sodium carbonate, and the reaction mixtures were gas-chromatographically analyzed.

For the Examples 11, 12, 17, 22, 23, 25, 30, and 33 the following apparatus and work technique were used:

The reactions were carried out in a non-magnetic, acid-resistant steel autoclave having a volume of 200 ml. The autoclave was connected with a glass container which could be evacuated. The connection between the two vessels could be closed by means of a high pressure valve. Before the experiment the autoclave and glass container were evacuated to less than 0.5 mm. Hg in 30 min. The valve between the two vessels was closed and the glass container filled with highly purified nitrogen. The catalyst components and the solvent were then poured into the glass container in nitrogen atmosphere.

By opening the valve between the two vessels the catalyst solution was sucked into the evacuated autoclave. The connection to the vacuum pump was cut off in advance. The autoclave was then filled with monomer to the indicated pressure, which was kept constant during the whole reaction period. The autoclave was fitted with magnetic stirrer and stood in a water bath with the stated temperatures $\pm 0.1°$ C. The reacture mixtures were gas-chromatographically analyzed.

For Example 32 the apparatus and technique is described in the example.

EXAMPLE 1

Temperature: 20° C. Pressure: 1 atm. Solvent: 25 ml. chlorobenzene.

Monomer: Ethene. Catalyst: 15.2 mg. Ni(PCl$_3$)$_4$, 31.8 mg. aluminum-monoethyl-dichloride.

Reaction time: 30 min. Reaction product formed: 13 ml.

Composition of product: 69.7% C$_4$-olefines (of which 2.0% butene-1, 72.1% butene-2-trans and 26.0% butene-2-cis); 28.0% C$_6$-olefines (of which 0.6% 3-methylpentene-1, 14.4% 2-ethylbutene-1, 7.3% hexene-2-trans, 24.2% 3-methylpentene-2-trans, 2.1% hexene-2-cis and 51.4% 3-methylpentene-2-cis); 2.3% C$_8$- and higher olefines.

EXAMPLE 2

Temperature: 20° C. Pressure: 1 atm. Solvent: 25 ml. chlorobenzene.

Monomer: Ethene. Catalyst: 16.0 mg. Ni(CO)$_2$[P(Phenyl)$_3$]$_2$, 31.8 mg. aluminium-monoethyl-dichloride.

Reaction time: 30 min. Reaction product formed: 10 ml.

Composition of product: 75.6% C$_4$-olefines (of which 2.8% butene-1, 70.6% butene-2-trans and 26.5% butene-2-cis); 22.3% C$_6$-olefins (of which 0.8% 3-methylpentene-1, 14.3% ethylbutene-1, 12.2% hexene-2-trans, 23.5% 3-methylpentene-2-trans, 4.6% hexene-2-cis and 44.6% 3-methylpentene-2-cis); 2.1% C$_8$- and higher olefins.

EXAMPLE 3

Temperature: 20° C. Pressure: 1 atm. Solvent: 25 ml. chlorobenzene.

Monomer: Ethene. Catalyst: 15.2 mg. Ni(PCl$_3$)$_4$, 54.89 mg. Al$_2$(ethyl)$_3$Al$_3$.

Reaction time: 30 min. Reaction product formed: 12 ml.

Composition of product: 66.7% C$_4$-olefines (of which 2.7% butene-1, 70.5% butene-2-trans and 26.8% butene-2-cis); 30.7% C$_6$-olefines (of which 0.6% 3-methylpentene-1, 12.4% 2-ethylbutene-1, 7.3% hexene-2-trans, 25.0% 3-methylpentene-2-trans, 2.8% hexene-2-cis and 52.0% 3-methylpentene-2-cis); 2.8% C$_8$- and higher olefines.

EXAMPLE 4

Temperature: 20° C. Pressure: 1 atm. Solvent: 25 ml. benzene.
Monomer: Ethene:butene-2 (2:1 gas volume, 20° C.).
Catalyst: 6.78 mg. Ni(CO)$_2$(2.2'-dipyridyl), 25.3 mg. tri-n butyl-phosphine 63.5 mg. aluminium-monoethyl-dichloride.
Reaction time: 30 min. C$_6$- and higher olefines formed: 8 ml.
Composition of product: 94.5% C$_6$-olefines (of which 0.9% 3-methylpentene-1, 18.5% 2-ethylbutene-1, 8.9% hexene-2-trans, 21.9% 3-methylpentene-2-trans, 4.9% hexene-2-cis and 44.9% 3-methylpentene-2-cis); 5.5% C$_8$- and higher olefines.

EXAMPLE 5

Temperature: 10° C. Pressure: 1 atm. Solvent: 50 ml. benzene.
Monomer: Ethene. Catalyst: 152 mg. Ni(PCl$_3$)$_4$, 65.6 mg. triphenylphosphine and 34 mg. beryllium-diethyl.
Reaction time: 30 min. Reaction product formed: 8 ml.
Composition of product: 92.0% C$_4$-olefines (of which 2.4% butene-1, 69.5% butene-2-trans and 28.1% butene-2-cis); 7.0% C$_6$-olefines (of which 0.5% 3-methylpentene-1, 16.1% 2-ethylbutene-1, 7.4% hexene-2-trans, 24.8% 3-methylpentene-2-trans, 2.5% hexene-2-cis and 48.7% 3-methylpentene-2-cis); 1% C$_8$- and higher olefines.

EXAMPLE 6

Temperature: 10° C. Pressure: 1 atm. Solvent: 25 ml. chlorobenzene.
Monomer: Ethene/propene (1:1 gas volume, 20° C.).
Catalyst: 15.2 mg. Ni(PCl$_3$)$_4$, 63.5 mg. aluminium-monoethyldichloride.
Reaction time: 30 min. Reaction product formed: 18 ml.
Composition of product: 29.1% C$_4$-olefines (of which 1.8% butene-1, 71.9% butene-2-trans and 26.4% butene-2-cis); 40.8% C$_5$-olefins (of which 54.3% n-pentene-isomers and 45.7% 2-methylbutene-isomers); 25.1% C$_6$-olefines (of which 58.5% 2-methylpentene-isomers, 7.6% n-hexene-isomers, 17.0% 3-methylpentene-isomers and 16.8% 2.3-dimethylbutene-isomers); 5% C$_7$- and higher olefines.

EXAMPLE 7

Temperature: 20° C. Pressure: 1 atm. Solvent: 25 ml. chlorobenzene.
Monomer: Propene. Catalyst: 6.78 mg. Ni(CO)$_2$(2.2'-dipyridyl), 11.57 mg. diphenylsulfide and 63.5 mg. aluminium-monoethyldichloride.
Reaction time: 60 min. Reaction product formed: 7 ml.
Composition of product: 95.3% C$_6$-olefines (of which 0.5% 4-methylpentene-1, 3.5% 4-methylpentene-2-cis, 1.0% 2.3-dimethylbutene-1, 24.3% 4-methylpentene-2-trans, 2.9% 2-methylpentene-1, 5.1% hexene-3-cis/trans, 14.4% hexene-2-trans, 39.6% 2-methylpentene-2, 4.8% hexene-2-cis and 3.8% 2.3-dimethylbutene-2); 4.7% C$_9$- and higher olefines.

EXAMPLE 8

Temperature: 20° C. Pressure: 1 atm. Solvent: 25 ml. chlorobenzene.
Monomer: Propene. Catalyst: 16.0 mg. Ni(CO)$_2$[P(phenyl)$_3$]$_2$; 66.68 mg. aluminium-tribromide.
Reaction time: 30 min. Reaction product formed: 10 ml.
Composition of product: 88.1% C$_6$-olefines (of which 0.6% 4-methylpentene-1, 2.4% 4-methylpentene-2-cis, 0.7% 2.3-dimethylbutene-1, 17.1% 4-methyl-pentene-2-trans, 1.4% 2-methylpentene-1, 5.4% hexene-3-cis and trans, 15.4% hexene-2-trans, 46.9% 2-methylpentene-2, 5.1% hexene-2-cis and 5.0% 2.3-dimethylbutene-2); 11.9% C$_9$- and higher olefines.

EXAMPLE 9

Temperature: 20° C. Pressure: 1 atm. Solvent: 25 ml. chlorobenzene.
Monomer: Propene. Catalyst: 16.78 mg. Ni(CO)$_2$(2.2'-dipyridyl); 7.01 mg. triccyclohexylphosphine and 31.8 mg. aluminium-monoethyldichloride.
Reaction time: 60 min. Reaction product formed: 6 ml.
Composition of product: 90.5% C$_6$-olefines (of which 0.9% 4-methylpentene-1, 1.5% 4-methylpentene-2-cis, 44.4% 2.3-dimethylbutene-1, 26.8% 4-methylpentene-2-trans, 6.2% 2-methylpentene-1, 0.3% hexene-3-cis and trans, 1.9% hexene-2-trans, 7.1% 2-methylpentene-2, 1.2% hexene-2-cis and 9.9% 2.3-dimethylbutene-2); 9.5% C$_9$- and higher olefines.

EXAMPLE 10

Temperature: 20° C. Pressure: 1 atm. Monomer: Propene.
Catalyst solution: 1 ml. of a chlorobenzene solution containing 3.8 mg. [(cyclopentadienyl)Ni(CO)]$_2$ and 6.5 mg. triphenylphosphine heated to 60° C. for one hour, was mixed in the reaction vessel with 35.4 mg. tricyclohexylphosphine, 120 mg. aluminium-diethyl-monochloride, 127 mg. aluminium-monoethyl-dichloride and 25 ml. chlorobenzene and prereacted for 45 min. at 20° C.
Reaction time: 60 min. Reaction product formed: 13 ml.
Composition of product: 95.0% C$_6$-olefines (of which 0.9% 4-methylpentene-1, 2.8% 4-methylpentene-2-cis, 11.2% 2.3-dimethylbutene-1, 29.0% 4-methylpentene-2-trans, 7.8% 2-methylpentene-1, 4,2% hexene-3-cis and trans, 11.7% hexene-2-trans, 26.2% 2-methylpentene-2, 2.3% hexene-2-cis and 3.7% 2.3-dimethylbutene-2); 5.0% C$_9$- and higher olefines.

EXAMPLE 11

Temperature: 20° C. Pressure: 5 atm. Solvent: 50 ml. chlorobenzene.
Monomer: Propene. Catalyst: 231 mg. RhCl[P(phenyl)$_3$]$_3$, 317.5 mg. aluminium-monoethyl-dichloride.
Reaction time: 60 min. Reaction product formed: 20 ml.
Composition of product: 87.6% C$_6$ olefines (of which 1.6% 4-methylpentene-1, 8.5% 4-methylpentene-2-cis, 10.7% 2.3-dimethylbutene-1, 25.6% 4-methylpentene-2-trans, 10.1% 2-dimethylpentene-1, 3.9% hexene-3-cis and trans, 13.2% hexene-2-trans, 22.5% 2-methylpentene-2 and 3.9% hexene-2-cis); 12.4% C$_9$- and higher olefines.

EXAMPLE 12

Temperature: 0° C. Pressure: 3 atm. Solvent: 25 ml. chlorobenzene.
Monomer: Propene. Catalyst: 7.6 mg. Ni(PCl$_3$)$_4$, 15.88 mg. aluminium-monoethyl-dichloride.
Reaction time: 60 min. Reaction product formed: 16 ml.
Composition of product: 98.8% C$_6$-olefines (of which 0.6% 4-methylpentene-1, 2.9% 4-methylpentene-2-cis, 14.2% 2.3-dimethylbutene-1, 23.7% 4-methylpentene-2-trans, 5.1% 2-methylpentene-1, 1.1% hexene-3-cis and trans, 3.0% hexene-2-trans, 37.8% 2-methylpentene-2, 1.0% hexene-2-cis and 10.6% 2.3 dimethylbutene-2); 1.2% C$_9$- and higher olefines.

EXAMPLE 13

Temperature: 20° C. Pressure: 1 atm. Solvent: 25 ml. chlorobenzene.
Monomer: Ethene. Catalyst: 0.063 ml. of a 0.2 M [(tert.-butyl)$_2$PH]$_2$Ni(CO)$_2$ - chlorobenzene solution and 63.5 mg. aluminium-monoethyl-dichloride.
Reaction time: 30 min. Reaction product formed: 9 ml.
Composition of product: 64.8% C$_4$-olefines (of which 2.1% butene-1, 71.5% butene-1, 71.5% butene-2-trans and 26.4% butene-2-cis); 23.5% C$_6$-olefines (of which 1.5% 3-methylpentene-1, 0.6% hexene-1, 17.9% hexene - 3 - cis/trans, 42.7% hexene-2-trans, 3.1% 3 - methylpentene - 2 - trans, 14.2% hexene - 2 - cis 20.0% 3 - methylpentene - 2 - cis); 11.7% $C_8$ - and higher olefines.

EXAMPLE 14

Temperature: 20° C. Pressure: 1 atm. Solvent: 25 ml. chlorobenzene.
Monomer: Ethene. Catalyst: 12.84 mg.

$$[CH_3-CH_2-C\begin{smallmatrix}CH_2O\\-CH_2O-\\CH_2O\end{smallmatrix}P]\ Ni(CO)_3\ +$$

50.6 mg. tri-n-butylphosphine, prereacted in the solvent for 30 min., and 127 mg. aluminium-monoethyl-dichloride.
Reaction time: 30 min. Reaction product formed: 11 ml.
Composition of product: 74.0% $C_4$-olefines (of which 1.5 of butene-1, 72.3% butene-2-trans and 26.2% butene-2-cis); 24.0% $C_6$-olefines (of which 10.9% 2-ethylbutene-1, 5.9% hexene-2-trans, 28.5% 3-methylpentene - 2-trans and 54.7% 3-methylpentene-2-cis); 2.0% $C_8$- and higher olefines.

EXAMPLE 15

Temperature: 20° C. Pressure: 1 atm. Solvent: 25 ml. chlorobenzene.
Monomer: Ethene. Catalyst: 10.7 mg.

$$Ni[(C_6H_5)_2P-(CH_2)_2-P(C_6H_5)_2]_2$$

and 63.5 mg. aluminium-monoethyl-dichloride.
Reaction time: 30 min. Reaction product formed: 8 ml.
Composition of product: 87.1% $C_4$-olefines (of which 2.5% butene-1, 70.9% butene-2-trans and 26.6% butene-2-cis); 10.2% $C_6$-olefines (of which 3.2% 3-methylpentene-1, 11.7% 2-ethylbutene-1, 24.5% hexene-2-trans, 17.0% 3-methylpentene-2-trans, 5.3% hexene-2-cis and 38.3% 3-methylpentene-2-cis); 2.7% $C_8$- and higher olefines.

EXAMPLE 16

Temperature: 20° C. Pressure: 1 atm. Solvent: 25 ml. chlorobenzene.
Monomer: Ethene. Catalyst: 7.35 mg. [phenanthroline] $Ni(CO)_2$, 25.3 mg. tri-n-butylphosphine and 63.5 mg. aluminium-monoethyldichloride.
Reaction time: 30 min. Reaction product formed: 12 ml.
Composition of product: 68.7% $C_4$-olefines (of which 1.9% butene-1, 71.5% butene-2-trans and 26.6% butene-2-cis); 19.2% $C_6$-olefines (of which 0.6% 3-methylpentene-1, 27.6% 2-ethylbutene-1, 16.9% hexene-2-trans, 27.1% 3-methyl-pentene-2-trans and 27.6% 3-methylpentene-2-cis); 12.1% $C_8$- and higher olefines.

EXAMPLE 17

Temperature: 20° C. Pressure: 25 atm. Solvent: 25 ml. chlorobenzene.
Monomer: Ethene. Catalyst: 10.7 mg. dicyclopentadienyldinickel-diphenylacetylene, 5.1 mg. tri-n-butylphosphine and 31.8 mg. aluminium-monoethyl-dichloride.
Reaction time: 95 min. Reaction product formed: 34 ml.
Composition of product: 84.3% $C_4$-olefines (of which 3.3% butene-1, 68.7% butene-2-trans and 28.0% butene-2-cis); 14.2% $C_6$-olefines (of which 0.8% 3-methylpentene-1, 0.6% hexene-1, 10.7% hexene-3-cis/trans, 23.0% 2-ethyl-butene-1, 39.2% hexene-2-trans, 3.0% 3-methylpentene-2-trans, 13.0% hexene-2-cis and 9.7% 3-methylpentene-2-cis); 1.5% $C_7$- and higher olefines.

EXAMPLE 18

Temperature: 20° C. Pressure: 1 atm. Solvent: 25 ml. chlorobenzene.
Monomer: Ethene. Catalyst: 16.25 mg. $[(C_6H_5O)_3P]_4Ni$ and 63.5 mg. aluminium-monoethyl-dichloride.
Reaction time: 30 min. Reaction product formed: 2 ml.
Composition of product: 100% $C_4$-olefines (of which 0.8% butene-1, 79.7% butene-2-trans and 19.5% butene-2-cis).

EXAMPLE 19

Temperature: 20° C. Pressure: 1 atm. Solvent: 25 ml. chlorobenzene.
Monomer: Ethene. Catalyst: 12.85 mg.

$$[(C_6H_5)_2P-(CH_2)_2-P(C_6H_5)_2]Ni(CO_2)$$

and prereacted 50.6 mg. tri-n-butylphosphine+63.5 mg. aluminium-monoethyl-dichloride.
Reaction time: 30 min. Reaction product formed: 1 ml.
Composition of product: 100% $C_4$-olefines (of which 14.1% butene-1, 42.2% butene-2-trans and 43.8% butene-2-cis).

EXAMPLE 20

Temperature: 20° C. Pressure: 1 atm. Solvent: 15 ml. dichloroethane+10 ml. n-heptane.
Monomer: Ethene. Catalyst: 17.07 mg.

$$[(C_6H_{11})_3P]_2Ni(CO)_2(C_6H_{11}=cyclohexyl)$$

and 63.5 mg. aluminium-monoethyl-dichloride.
Reaction time: 30 min. Reaction product formed: 16 ml.
Composition of product: 52.6% $C_4$-olefines (of which 4.3% butene-1, 64.2% butene-2-trans and 31.5% butene-2-cis); 21.4% $C_6$-olefines (of which 5.6% 3-methylpentene-1, 26.5% 2-ethylbutene-1, 6.2% hexene-2-trans, 13.1% 3-methylpentene-2-trans, 5.2% hexene-2-cis and 43.5% 3-methylpentene-2-cis); 26.0% $C_8$- and higher olefines.

EXAMPLE 21

Temperature: 20° C. Pressure: 1 atm. Solvent: 25 ml. chlorobenzene.
Monomer: Ethene. Catalyst: 17.7 mg.

$$[CH_3-CH_2-C\begin{smallmatrix}CH_2O\\-CH_2O-\\CH_2O\end{smallmatrix}P]_4Ni$$

and 63.5 mg. aluminium-monoethyl-dichloride. The conversion started after an induction period of 45 min.
Reaction time: 30 min. Reaction product formed: 2 ml.
Composition of product: 100% $C_4$-olefines (of which 1.1% butene-1, 73.9% butene-2-trans and 25.0% butene-2-cis).

EXAMPLE 22

Temperature: 20° C. Pressure: 2 atm. Solvent: 25 ml. chlorobenzene.
Monomer: Ethene. Catalyst: 11.2 mg.

$$[(C_6H_5)_3As]Ni(CO)_3$$

and 63.5 mg. aluminium-monoethyl-dichloride.
Reaction time: 30 min. Reaction product formed: 53 ml.
Composition of product: 45.9% $C_4$-olefines (of which 4.0% butene-1, 69.4% butene-2-trans and 26.6% butene-2-cis); 35.4% $C_6$-olefines (of which 1.3% 3-methylpentene-1, 0.4% hexene-1, 10.8% hexene-3-cis/trans, 28.0% hexene-2-trans, 17.7% 3-methylpentene-2-trans, 9.3% hexene-2-cis and 32.5% 3-methylpentene-2-cis); 18.7% $C_8$- and higher olefines.

EXAMPLE 23

Temperature: 20° C. Pressure: 2 atm. Solvent: 25 ml. chlorobenzene.
Monomer: Ethene. Catalyst: 8.7 mg.

$$\begin{matrix}S=C----S & P(C_6H_{11})_3\\ \diagdown & \diagup\\ Ni & Ni\\ \diagup & \diagdown\\ (C_6H_{11})_3P & S----C=S\end{matrix}$$

and 63.5 mg. aluminium-monoethyl-dichloride.
Reaction time: 30 min. Reaction product formed: 37 ml.
Composition of product: 45.6% $C_4$-olefines (of which 9.2% butene-1, 49.9% butene-2-trans and 40.9% butene-2-cis); 29.2% $C_6$-olefines (of which 20.0% 3-methylpentene-1, 0.3% hexene-1, 1.5% hexene-3-cis/trans, 2.6% 2-ethyl-butene-1, 5.5% hexene-2-trans, 15.7% 3-methylpentene-2-trans, 1.9% hexene-2-cis and 52.5% 3-methylpentene-2-cis); 25.2% $C_8$- and higher olefines.

EXAMPLE 24

Temperature: 20° C. Pressure: 1 atm. Solvent: 25 ml. chlorobenzene.

Monomer: Ethene. Catalyst: In a separate reaction between $[(C_6H_{11})_3P]_2Ni(CO)_2$ and $$(C_6H_{11})_3P (C_6H_{11}=cyclohexyl)$$

in the ratio 1:2 in xylene at reflux conditions for 17 hours a blue solid compound was obtained. An IR-spectrum of the compound did not show the presence of any carbonyl groups, and the nickel content was found to be 17.31%. As catalyst was used 15.9 mg. of this compound and 63.5 mg. aluminium-monoethyl-dichloride. Reaction time: 60 min. Reaction product formed: 17 ml. After 30 min. a sample was taken from the reaction mixture for analysis. It was found to have the following composition:

51.2% $C_4$-olefines (of which 5.5% butene-1, 64.0% butene-2-trans and 30.5% butene-2-cis); 22.5% of $C_6$-olefines (of which 10.6% 3-methylpentene-1, 0.4% hexene-1, 18.0% 2-ethylbutene-1, 8.1% hexene-2-trans, 14.4% 3 methylpentene-2-trans, 3.8% hexene-2-cis and 44.7% 3-methylpentene-2-cis); 26.3% $C_8$- and higher olefines.

Composition of product after a reaction time of 60 min.: 59.7% $C_4$-olefines (of which 3.4% butene-1, 69.1% butene-2-trans and 27.5% butene-2-cis); 19.1% $C_6$-olefines (of which 12.7% 3-methylpentene-1, 0.4% hexene-1, 4.6% 2-ethylbutene-1, 9.6% hexene-2-trans, 15.7% 3-methylpentene-2-trans, 8.7% hexene-2-cis and 48.3% 3-methylpentene-2-cis); 21.2% $C_8$- and higher olefines.

EXAMPLE 25

Temperature: 30° C. Pressure: 5 atm. Solvent: 25 ml. chlorobenzene.

Monomer: Ethene. Catalyst: 12.67 mg. [1.2.3.4.-tetraphenyl-cyclobutadien] $Co^I(CO)_2Cl$, 32.75 mg. triphenylphosphine, 63.5 mg. aluminium-monoethyl-dichloride and 60.3 mg. aluminium-diethyl-monochloride. Reaction time: 660 min. Reaction product formed: 12 ml. Composition of product: 98.0% $C_4$-olefines (of which 2.4% butene-1, 61.5% butene-2-trans and 36.1% butene-2-cis); 1.4% $C_6$-olefines (of which 4.4% 3-methylpentene-1, 0.9% hexene-1, 7.8% hexene-3-cis/trans, 13.7% 2-ethylbutene-1, 24.8% hexene-2-trans, 12.3% 3-methylpentene-2-trans, 8.3% hexene-2-cis and 27.8% 3-methylpentene-2-cis); 0.6% $C_8$- and higher olefines.

EXAMPLE 26

Temperature: 20° C. Pressure: 1 atm. Solvent: 25 ml. chlorobenzene.

Monomer: Ethene. Catalyst: 28.9 mg. $[PC_6H_5)_3]_4Pd$ and 63.5 mg. aluminum-monoethyl-dichloride.

Reaction time: 120 min. Reaction product formed: 1.5 ml.

Composition of product: 97.2% $C_4$-olefines (of which 2.3% butene-1, 65.0% butene-2-trans and 32.7% butene-2-cis); 2.3% $C_6$-olefines (of which 0.7% hexene-1, 8.0% hexene-3-cis/trans, 3.2% 2-ethylbutene-1, 21.3% hexene-2-trans, 16.7% 3-methylpentene-2-trans, 7.2% hexene-2-cis; and 42.9% 3-methylpentene-2-cis); 0.5% $C_8$- and higher olefines.

EXAMPLE 27

Temperature: 40° C. Pressure: 1 atm. Solvent: 25 ml. n-heptane,

Monomer: Ethene. Catalyst: 7.4 mg.

$$[(n-butyl)_3P]_2Ni(CO)_2$$

and 63.5 mg. aluminium-monoethyl-dichloride.

Reaction time: 30 min. Reaction product formed: 4 ml.

Composition of product: 80.3% $C_4$-olefines (of which 2.3% butene-1, 69.3% butene-2-trans and 28.4% butene-2-cis); 17.7% $C_6$-olefines (of which 2.0% 3-methylpentene-1, 0.2% hexene-1, 3.7% hexene-3-cis/trans, 18.3% 2-ethylbutene-1, 10.4% hexene-2-trans, 21.7% 3-methylpentene-2-trans, 3.5% hexene-2-cis and 40.2% 3-methylpentene-2-cis); 2.0% $C_8$- and higher olefines.

EXAMPLE 28

Temperature: 20° C. Pressure: 1 atm. Solvent: 25 ml. chlorobenzene.

Monomer: Ethene. Catalyst: 2.42 mg. [duroquinone]$_2$Ni and 68.4 mg. aluminium-monoethyl-monoethoxy-chloride.

Reaction time: 30 min. Reaction product formed: 13 ml.

Composition of product: 81.6% $C_6$-olefines (of which 0.8% 4-methylpentene-1, 4.0% 4-methylpentene-2-cis, 30.8% 4-methylpentene-2-trans, 0.4% 2-methylpentene-1, 4.5% hexene-3-cis/trans, 12.9% hexene-2-trans, 38.4% 2-methylpentene-2, 4.1% hexene-2-cis and 4.1% 2.3-dimethylbutene-2); 18.4% $C_9$- and higher olefines.

EXAMPLE 29

Temperature: 20° C. Pressure: 1 atm. Solvent: 25 ml. chlorobenzene.

Monomer: Propene. Catalyst: 1.25 ml. of a 0.01 M $[(C_2H_5)_2N)_3P]_2Ni(CO)_2$ chlorobenzene solution and 63.5 mg. aluminium-monoethyl-dichloride.

Reaction time: 60 min. Reaction product formed: 4 ml.

Composition of product: 90.8% $C_6$-olefines (of which 1.2% 4-methylpentene-1, 7.5% 4-methylpentene-2-cis, 54.7% 4-methylpentene-2-trans, 4.4% hexene-3-cis/trans, 15.3% hexene-2-trans, 11.3% 2-methylpentene-2, 3.4% hexene-2-cis, 2.2% 2.3-dimethylpentene-2); 9.2% $C_9$- and higher olefines.

EXAMPLE 30

Temperature: 20° C. Pressure: 2 atm. Solvent: 25 ml. chlorobenzene.

Monomer: Ethene. Catalyst: 6.2 mg.

$$[(C_6H_5)_3Sb]Ni(CO)_3$$

and 63.5 mg. aluminium-monoethyl-dichloride.

Reaction time: 30 min. Reaction product formed: 5 ml.

Composition of product: 86.4% $C_4$-olefines (of which 1.8% butene-1, 73.1% butene-2-trans and 25.1% butene-2-cis); 3.8% $C_6$-olefines (of which 14.8% hexene-3-cis/trans, 49.5% hexene-2-trans, 0.6% 3-methylpentene-2-trans, 16.4% hexene-2-cis and 18.7% 3-methyl-2-cis); 9.8% $C_8$- and higher olefines.

EXAMPLE 31

Temperature: 20° C. Pressure: 1 atm. Solvent: 25 ml. chlorobenzene.

Monomer: Propene. Catalyst, 2.07 mg. [cyclooctadien]Ni [duroquinone] and 63.5 mg. aluminium-monoethyl-dichloride.

Reaction time: 60 min. Reaction product formed: 14 ml.

Composition of product: 81.6% $C_6$-olefines (of which 1.0% 4-methylpentene-1, 5.4% 4-methylpentene-2-cis, 44.2% 4-methylpentene-2-trans, 0.2% 2-methylpentene-1, 4.8% hexene-3-cis/trans, 15.3% hexene-2-trans, 23.0% 2-methylpentene-2, 4.2% hexene-2-cis and 1.9% 2.3-dimethylbutene-2); 18.4% $C_9$- and higher olefines.

EXAMPLE 32

Into an evacuated 1 liter acid resistant autoclave was introduced 80.7 mg. $Ni[PCl_3]_4$. The autoclave was equipped with a magnetic stirrer, and the temperature in the reaction mixture was adjusted by using water circulation thermostats. At room temperature 160.3 g. butene-2 were sucked into the autoclave from a bomb. The temperature in the liquid was adjusted to 40±0.5° C. where it was maintained during the entire experiment. Ethene, 2.5 g., was pressed into the autoclave to a pressure of 1 atm. A 30 ml. acid resistant steel bomb containing 268.5 mg. tri-n-butylphosphine+0.676 g. aluminium-monoethyl-dichloride dissolved in 14.7 g. chlorobenzene, and with ethene pressed on to a pressure of 6 atm., was mounted in advance on an inlet tube to the autoclave. The experiment was started by pressing the content of the steel bomb into the autoclave while simultaneously passing ethene into the reaction mixture at the rate of 1 normal liter per minute. The feed rate was maintained constant during the entire experiment.

After a reaction time of 30 min. a sample was taken from the reaction mixture for analysis. It was found to have the following composition: 71.0% $C_4$-olefines, 25.1% $C_6$-olefines and 3.9% $C_8$- and higher olefines. The experiment was stopped after 120 min., and the reaction mixture was analyzed.

Reaction product formed: 312.6 g.

Composition of product: 55.1% $C_4$-olefines (of which 2.8% butene-1, 67.9% butene-2-trans and 29.3% butene-2-cis); 39.4% $C_6$-olefines (of which 2.9% hexene-3-cis/trans, 8.3% hexene-2-trans, 2.8% hexene-2-cis, 0.6% 3-methylpentene-1, 18.5% 2-ethylbutene-1, 22.8% 3-methylpentene-2-trans and 44.1% 3-methylpentene-2-cis); 5.5% $C_8$- and higher olefines.

EXAMPLE 33

Temperature: 20° C. Pressure: 2 atm. Solvent: 25 ml. chlorobenzene.

Monomer: Propene. Catalyst: 3.8 mg. cyclopentadienyl-Ni-nitrocyl, 32.8 mg. triphenylphosphine and 63.5 mg. aluminum-monoethyl-dichloride.

Reaction time: 30 min. Reaction product formed: 8 ml.

Composition of product: 96.9% $C_6$-olefines (of which 0.7% 4-methylpentene-1, 1.2% 5-methylpentene-2-cis, 8.5% 2.3-dimethylbutene-1, 17.8% 4-methylpentene-2-trans, 9.3% 2-methylpentene-1, 4.0% hexene-3-cis/trans, 10.6% hexene-2-trans, 41.2% 2-methylpentene-2, 3.8% hexene-2-cis and 2.9% 2.3-dimethylbutene-2); 3.1% $C_9$- and higher olefines.

What is claimed is:

1. Process for the preparation of monoolefins in the range $C_4$–$C_{30}$ having a high content of β-olefins, characterized by reacting a feed consisting essentially of $C_2$ to $C_{15}$ monoolefins in the presence of a homogeneous catalyst mixture comprising a compound of the formula $Ni(PCl_3)_4$ and a Lewis acid selected from the group consisting of $Al_2(ethyl)_3Cl_3$ and ethylaluminum dichloride, at a temperature of not above 100° C.

2. The process of claim 1, wherein the catalyst mixture additionally contains a Lewis base phosphine.

3. The process of claim 2, wherein the Lewis base is tri-n-butyl phosphine.

4. The process of claim 2, wherein the Lewis base is tricyclohexyl phosphine.

5. The process of claim 1, wherein the starting monoolefins are selected from the group consisting of ethene, propene and butene.

References Cited

UNITED STATES PATENTS

| | | |
|---|---|---|
| 2,969,408 | 1/1961 | Nowlin et al. |
| 3,321,546 | 5/1967 | Roest et al. |
| 3,379,706 | 4/1968 | Wilke _____ 260—683.15 X |
| 3,390,201 | 6/1968 | Drew _____ 260—676 |
| 3,420,904 | 1/1969 | Hellwig. |
| 3,427,365 | 2/1969 | Maxfield. |

FOREIGN PATENTS

| | | |
|---|---|---|
| 6,612,339 | 3/1967 | Netherlands. |

OTHER REFERENCES

Ewers, Angew, Chem. internat. edit., vol. 5 (1966), No. 6 (June), page 584.

PAUL M. COUGHLAN, JR., Primary Examiner

U.S. Cl. X.R.

252—429, 431, 437